United States Patent
Niewels

(10) Patent No.: US 7,481,642 B2
(45) Date of Patent: Jan. 27, 2009

(54) METHOD AND APPARATUS FOR CONTROLLING A VENT GAP WITH ACTIVE MATERIAL ELEMENTS

(75) Inventor: Joachim Johannes Niewels, Thornton (CA)

(73) Assignee: Husky Injection Molding Systems Ltd. (CA)

( * ) Notice: Subject to any disclaimer, the term of this patent is extended or adjusted under 35 U.S.C. 154(b) by 952 days.

(21) Appl. No.: 10/830,438

(22) Filed: Apr. 23, 2004

(65) Prior Publication Data

US 2005/0236726 A1    Oct. 27, 2005

(51) Int. Cl.
*B29C 45/00* (2006.01)
*B29C 45/76* (2006.01)

(52) U.S. Cl. ............... 425/135; 425/146; 425/149; 425/812; 425/DIG. 226

(58) Field of Classification Search ............... 425/135, 425/149, 812, 146, DIG. 226
See application file for complete search history.

(56) References Cited

U.S. PATENT DOCUMENTS

| | | | |
|---|---|---|---|
| 4,420,454 A | 12/1983 | Kawaguchi et al. | |
| 4,431,047 A | 2/1984 | Takeshima et al. | |
| 4,469,649 A | 9/1984 | Ibar | |
| 4,489,771 A | 12/1984 | Takeshima et al. | |
| 4,556,377 A | 12/1985 | Brown | |
| 4,588,367 A | 5/1986 | Schad | |
| 4,660,801 A | 4/1987 | Schad | |
| 4,803,393 A * | 2/1989 | Takahashi | 310/328 |
| 4,828,769 A | 5/1989 | Maus et al. | |
| 4,852,634 A * | 8/1989 | Kawai et al. | 164/457 |
| 4,995,455 A | 2/1991 | Shigyo | |
| 5,004,038 A * | 4/1991 | Kuriyama | 164/305 |

(Continued)

FOREIGN PATENT DOCUMENTS

EP    0 448 855 A1    10/1991

(Continued)

OTHER PUBLICATIONS marco: Structure and characteristics of piezokeramisher pile actuators [online], marco Systemanalyse und Entwicklung GmbH, Sep. 16, 2003 Translated Version (from German to English by Yahoo translation tool) [retrieved on Oct. 13, 2004]<URL http://www.marco.de./E/D/pa/017.html>.

(Continued)

*Primary Examiner*—Steven P. Griffin
*Assistant Examiner*—Seyed Masoud Malekzadeh
(74) *Attorney, Agent, or Firm*—Katten Muchin Rosenman LLP

(57) ABSTRACT

Method and apparatus for controlling a vent gap in a mold for an injection molding machine are provided, and include an active material insert configured to be regulate the degree of opening of the vent gap. The active material insert is configured to be actuated in response to signals from a controller, so as to selectively block the opening of the vent gap during the molding process. Wiring structure is coupled to the active material insert, and is configured to carry the actuation signals. Melt flow sensors may also be provided to aid in regulating the vent gap, and may be connected to the controller in order to provide real-time closed loop control over the operation of the vent gap. Preferably, the methods and apparatus are used as part of a system for controlling the flow of melt within a mold cavity.

15 Claims, 7 Drawing Sheets

U.S. PATENT DOCUMENTS

| | | | |
|---|---|---|---|
| 5,127,173 A * | 7/1992 | Thurston et al. | 73/202 |
| 5,192,555 A | 3/1993 | Arnott | |
| 5,198,238 A * | 3/1993 | Baxi | 425/130 |
| 5,237,238 A | 8/1993 | Berghaus et al. | |
| 5,238,389 A | 8/1993 | Brandau et al. | |
| 5,397,230 A | 3/1995 | Brew | |
| 5,439,371 A | 8/1995 | Sawaya | |
| 5,454,991 A * | 10/1995 | Brew | 264/39 |
| 5,558,824 A * | 9/1996 | Shah et al. | 264/40.3 |
| 5,683,730 A | 11/1997 | Katsumata et al. | |
| 5,707,659 A * | 1/1998 | Erikson | 425/130 |
| 5,853,776 A | 12/1998 | Meijer | |
| 6,203,747 B1 | 3/2001 | Grunitz | |
| 6,289,259 B1 | 9/2001 | Choi et al. | |
| 6,343,925 B1 | 2/2002 | Jenko | |
| 6,629,831 B2 | 10/2003 | Wei et al. | |
| 7,066,141 B2 * | 6/2006 | Shafer et al. | 123/321 |
| 2002/0086087 A1 * | 7/2002 | Hamann | 425/590 |
| 2002/0175448 A1 * | 11/2002 | Pena | 264/406 |
| 2002/0185766 A1 * | 12/2002 | Daihisa et al. | 264/39 |
| 2005/0070871 A1 * | 3/2005 | Lawton et al. | 604/403 |

FOREIGN PATENT DOCUMENTS

| | | | |
|---|---|---|---|
| JP | 02046962 A * | 2/1990 | |
| JP | 08-252844 | 10/1996 | |

OTHER PUBLICATIONS

Piezo Square Stack Actuators: pss . . . [online], marco Systemanalyse und Entwicklung GmbH, Jan. 19, 2004, [retrieved on Oct. 13, 2004], <URL http://www.marco.de/E/D/pss/001.html>.

Piezoceramic Stack Actuators: pa/ps [online], marco Systemanalyse und Entwicklung GmbH, Feb. 17, 2004, [retrieved on Oct. 13, 2004], <URL http//www.marco.de/E/D/pa/ps/007.html>.

MIDE: Active Materials [online]Mide Teccnology Corporation, [retrieved on Oct. 13, 2004]<URL http://www.mide.com/active_materials.html>.

William J. Tobin, "Venting from the Inside", Plastics, Machinery & Equipment, Feb. 1990, page 55.

* cited by examiner

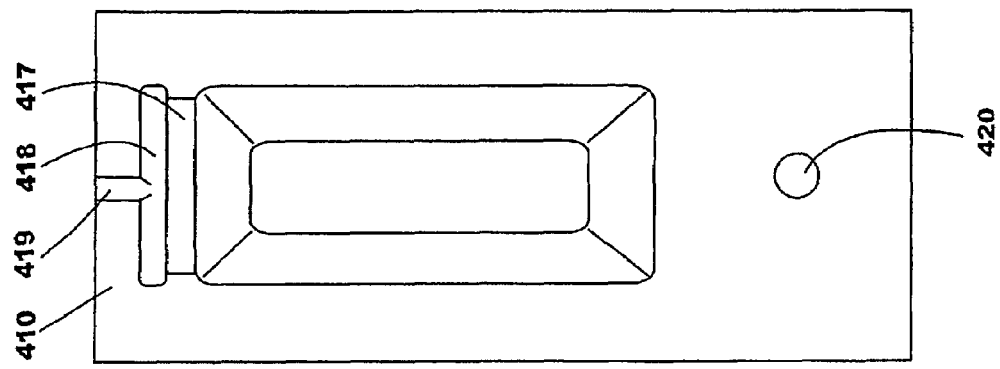
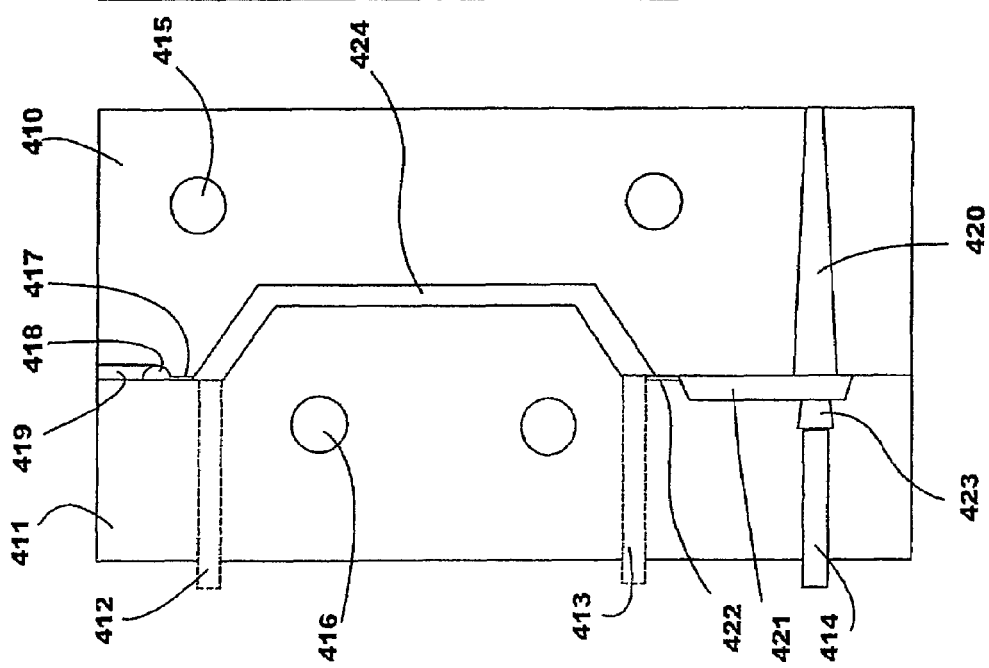
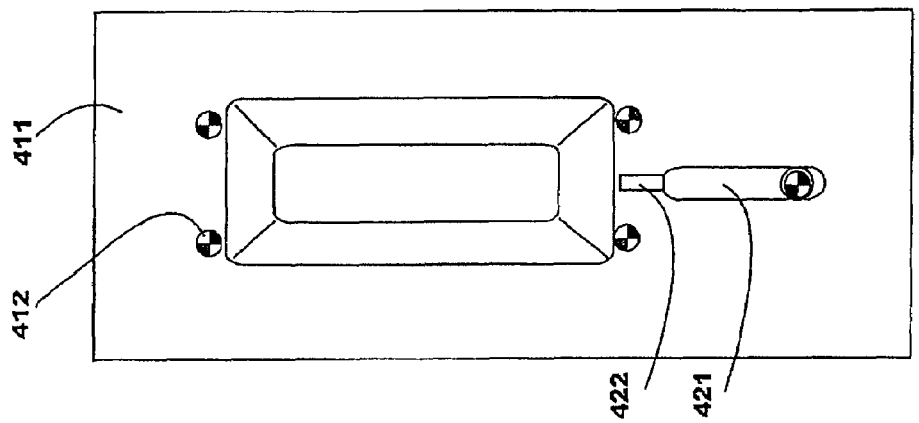

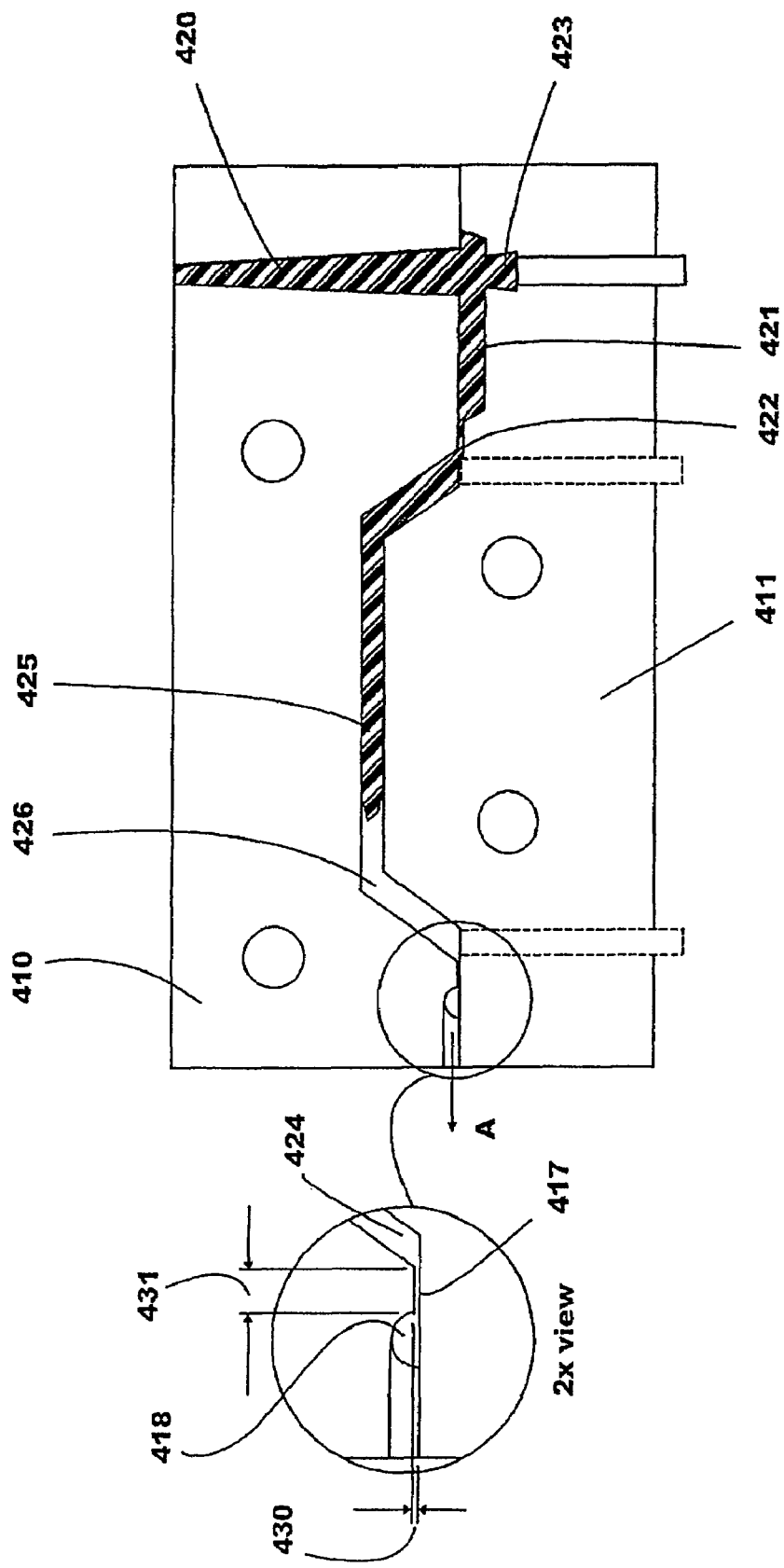
H-747 Figure 2
PRIOR ART

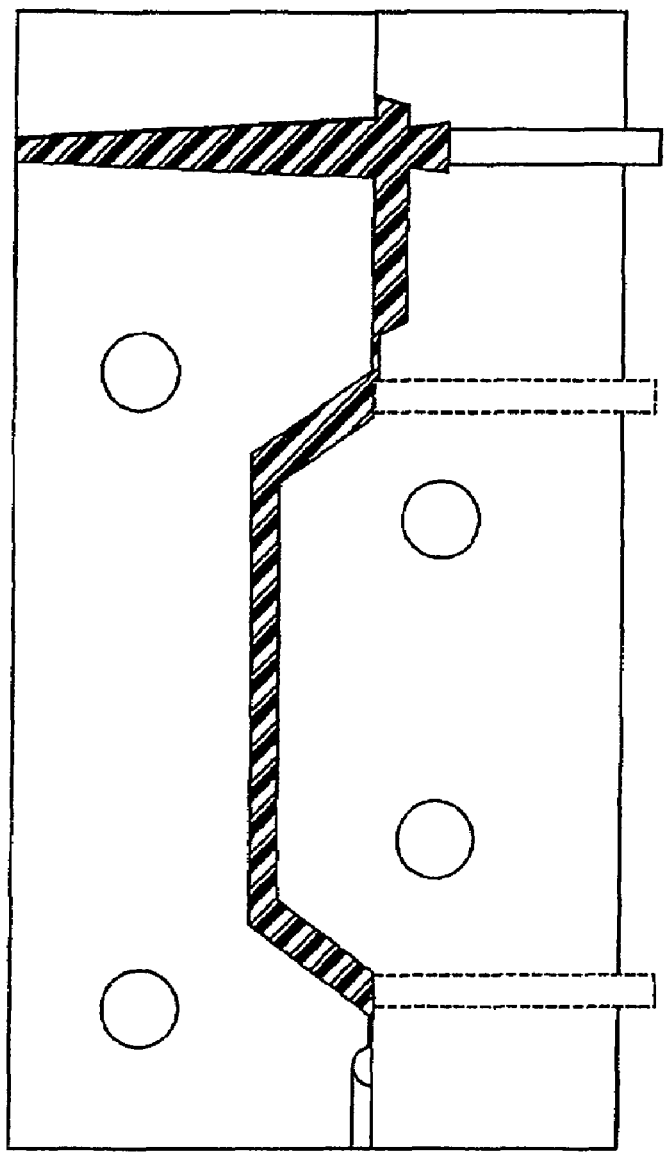
H-747 Figure 3
PRIOR ART

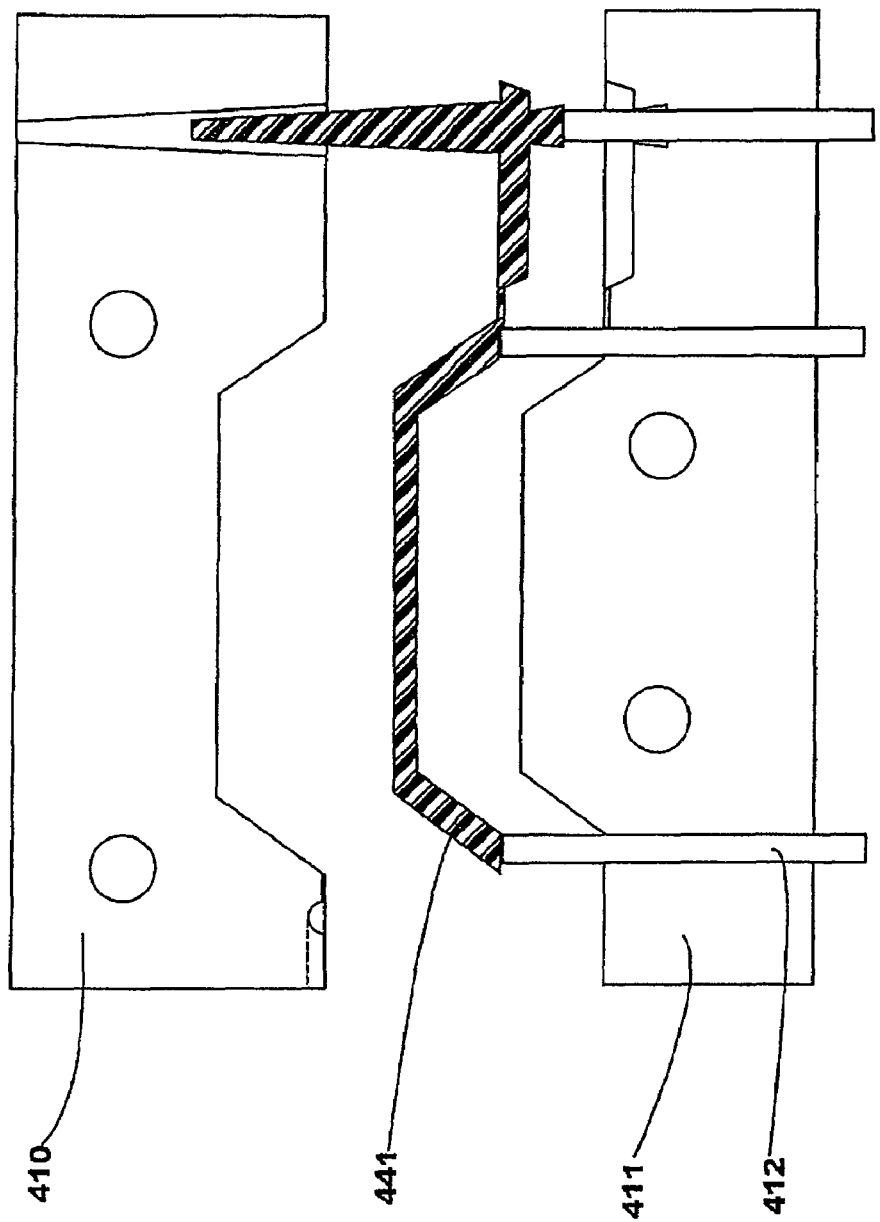
H-747 Figure 4
PRIOR ART

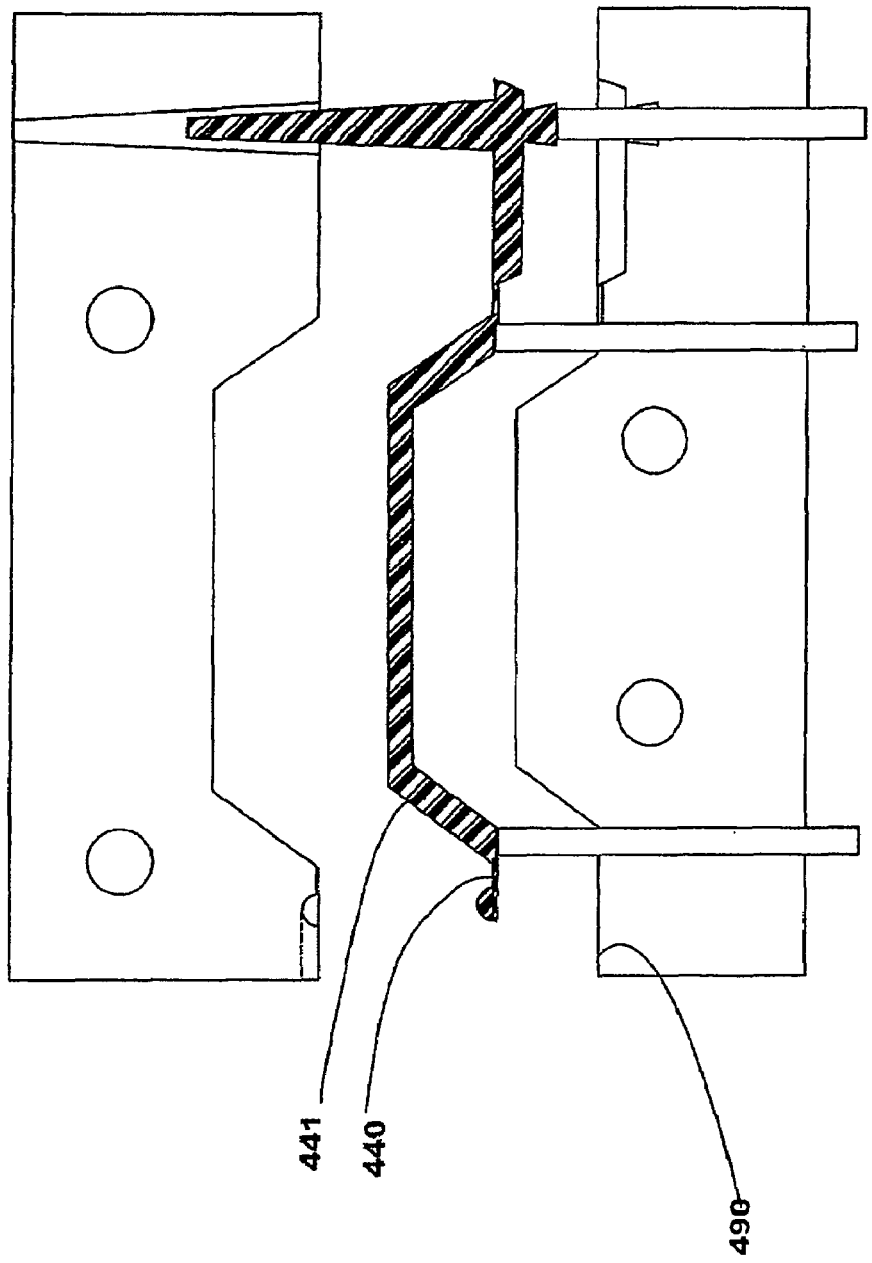

METHOD AND APPARATUS FOR CONTROLLING A VENT GAP WITH ACTIVE MATERIAL ELEMENTS

BACKGROUND OF THE INVENTION

1. Field of the Invention

The present invention relates to a method and apparatus in which active material elements are used in injection molding machine equipment (e.g., hot runner nozzle assemblies) in order to adjust a vent gap within a mold. "Active materials" are a family of shape altering materials such as piezoactuators, piezoceramics, electrostrictors, magnetostrictors, shape memory alloys, and the like. In the present invention, they are used to adjust the vent gap within an injection mold, thereby improving the quality of the molded article. The active material elements may also be used as sensors.

2. Related Art

Active materials are characterized as transducers that can convert one form of energy to another. For example, a piezo actuator (or motor) converts input electrical energy to mechanical energy causing a dimensional change in the element, whereas a piezo sensor (or generator) converts mechanical energy—a change in the dimensional shape of the element—into electrical energy. One example of a piezoceramic transducer is shown in U.S. Pat. No. 5,237,238 to Berghaus. One supplier of piezo actuators is Marco Systemanalyse und Entwicklung GmbH, Hans-Böckler-Str. 2, D-85221 Dachau, Germany, and their advertising literature and website illustrate such devices. Typically an application of 1,000 volt potential to a piezoceramic insert will cause it to "grow" approximately 0.0015"/inch (0.15%) in thickness. Another supplier, Midé Technology Corporation of Medford, Me., has a variety of active materials including magnetostrictors and shape memory alloys, and their advertising literature and website illustrate such devices, including material specifications and other published details.

FIGS. 1a-5 show a prior art mold to explain the venting problem. FIGS. 1a-1c show three views of a mold. The left view is the plan view of the core side, the right view is the plan view of the cavity side. The center view shows a section through the closed assembled mold. The mold comprises a cavity block 410 and a core block 411 and several ejector pins 412, 413 and 414. Both mold haves contain cooling channels 415 and 416. The cavity block 410 contains a vent 417, vent collector channel 418 and vent exhaust passage 419. The cavity block 410 also contains a melt sprue channel 420 for introducing the melt. The core block 411 contains a melt runner 421, gate 422 and sprue puller 423 machined in the core block 411. The closed mold encloses the mold cavity 424 which will form the part to be molded.

FIG. 2 shows the plastic material being injected into the closed mold cavity entering via sprue channel 420, runner 421 and through gate 422. As the resin 425 begins to fill the cavity 424, it displaces the air 426 that previously occupied that space. The melt pushes the air ahead of its flow path. Vent 417 has been positioned in the mold to provide a passageway for the air to escape and for this passageway to remain open until the resin has completely filled the mold cavity 424. Thus the vent 417 is usually positioned at a part of the mold cavity 424 periphery usually the furthest distance from the gate 422, the point at which the resin enters the mold cavity. If the vent were to be positioned at some other point the incoming resin may reach the vent, blocking it off and prevented any remaining air in the mold cavity from escaping through it.

The vent 417 is sized such that when the resin reaches that location it will not flow into the vent or the vent collector 418 beyond it. The vent gap 430 is typically 0.025 mm-0.075 mm (0.001"-0.003"), which is a large enough space to allow air to pass through, but a small enough space to prevent most resins from being able to flow therethrough. The depth of the vent is called the land 431 and is typically 0.625 mm-1.250 mm (0.025"-0.050"). The vent collector 418 is a much larger channel behind the vent 417 to allow unrestricted passage for the air that has passed through the vent. Vent exhaust passage 419 connects the vent collector 418 to the mold exterior so the air can exhaust to ambient conditions. The exhausted air exits the mold as indicated by arrow A in FIG. 2. When the injected melt reaches the vent it is too viscous to enter the small gap. FIG. 3 shows the filled cavity. FIG. 4 shows the mold opening and the ejector pins activated to push the solidified part 441 off the core half of the mold.

FIG. 5 shows what happens when the injected melt enters the vent and vent collector. This can happen if the melt injection pressure is high enough to overcome the clamping force holding the mold closed and the mold halves are forced apart, consequently increasing the vent gap and allowing the melt to enter. Alternatively, the viscosity of the melt being processed may happen to be much lower than that for which the vent gap has been designed. Sometimes this molded flash 440 remains attached to the molded part 441 and is ejected with it as illustrated in FIG. 5. On other occasions, the flash breaks off and remains in the vent and vent collector blocking them for the next molding cycle, and consequently the mold venting functions poorly and may result in a defective part being molded.

Another vent problem that may occur is when the vent gap is reduced or eliminated by hobbing of the mold. Because the vent is positioned on the mold's parting line 490 the repeated opening, closing, and clamping of the mold, as it cycles, can cause the parting line surface to gradually collapse. The effect of this is to reduce the vent gap. Periodically as molds wear their vents are remachined to restore the correct vent gap. When the vent gap is reduced or eliminated, the resulting poor or no venting of the mold cavity during the injection process may cause defective parts to be molded.

A Plastics Machinery & Equipment article by William J. Tobin, titled "Venting from the Inside", contains a general overview of venting in injection molds.

U.S. Pat. No. 5,238,389 to Brandau et al. discloses a blow mold clamp mechanism for closing blow mold halves to an adjustable closed position, leaving a predetermined gap therebetween to act as a vent. In blow molding, the material in the cavity is a heated parison or preform that is being expanded in size by a compressed fluid in order to conform to the cavity shape. While there is a need to vent the mold to exhaust the air displaced by the expanding preform, the risk of material entering the vent gap is much lower than it is in an injection mold in which the material is in a heated fluid condition.

U.S. Pat. No. 4,489,771 to Takeshima et al. discloses means for automatically closing the vent of an injection mold when the injected material reaches the vent. A complicated, space-consuming mechanism is used at each vent location to preform this function.

EP 0 448 855 to Ryobi discloses a gas vent control valve for opening and closing a gas vent passage in a mold. The time taken from when the vent is signaled to close until it is actually closed is measured and compared to a preset period. If the actual time taken exceeds the preset period, an alarm is sounded, signaling an abnormality in operation.

U.S. Pat. No. 4,995,445 to Shigyo discloses a gas vent valve in a mold that is operated to close the vent passage in response to a pressure from the molten material in the mold cavity. A complex, space-consuming mechanism is mounted in the mold at the periphery of the mold cavity.

U.S. Pat. No. 5,397,230 to Brew discloses a vent apparatus for a mold comprising a reciprocating pin. The vent pin is responsive to a full resin level in the mold cavity to close the vent opening. While the vent pin is closed, cleansing fluid is circulated through the vent passage to clear resin debris prior to it hardening. The apparatus comprises a comparatively large pin and operating cylinder arrangement attached to the side of the mold cavity.

U.S. Pat. No. 5,683,730 to Katsumata et al. discloses a mechanically-operated closeable vent arrangement. There is a detection chamber that reacts to the incoming melt pressure and moves to operate a pin that closes the vent. A relatively large apparatus is used that takes up space in the mold structure.

Thus, what is needed is a new technology capable of closing a vent passage in a mold when the incoming melt material reaches the vent means, preferably including adjustable control, and preferably with embedded sensors and closed loop control of the closing function.

SUMMARY OF THE INVENTION

It is an advantage of the present invention to provide injection molding machine apparatus and method to overcome the problems noted above, and to provide an effective, efficient means for adjusting an opening of a vent gap in an injection molding machine.

According to a first aspect of the present invention, structure and/or steps are provided for controlling an injection mold vent gap, including an active material disposed adjacent the vent gap and configured to change dimension upon application of an electrical signal to at least partially close the vent gap, and transmission structure configured, in use, to supply the electrical signal to said active material element.

According to a second aspect of the present invention, structure and/or steps are provided for an injection mold vent gap control device including a piezo-electric actuator disposed to at least partially block a mold vent that is in communication with a mold cavity.

According to a third aspect of the present invention, structure and/or steps are provided for an injection mold, including a first mold half, a second mold half, a vent for venting gas from at least one of the first mold half and the second mold half, and a piezo-electric element configured to change dimension upon application and removal of an actuation signal thereto, said dimension change at least partially closing or opening said vent to control the venting of gas therethrough.

BRIEF DESCRIPTION OF THE DRAWINGS

Exemplary embodiments of the presently preferred features of the present invention will now be described with reference to the accompanying drawings in which:

FIGS. 1a, 1b, and 1c show three schematic views of a prior art mold with a conventional vent;

FIG. 2 is a sectional view of the mold in FIG. 1b with the incoming material partially filling the mold cavity;

FIG. 3 is a sectional view of the mold in FIG. 1b with the material filling the mold cavity;

FIG. 4 is a sectional view of the mold in FIG. 1b with the mold in a partially open position and the molded part being ejected;

FIG. 5 is a sectional view of the mold in FIG. 1b with the mold in a partially open position and the molded part having a flashed vent portion being ejected;

DETAILED DESCRIPTION OF THE PRESENTLY PREFERRED EXEMPLARY EMBODIMENTS

1. Introduction

Figure 6:
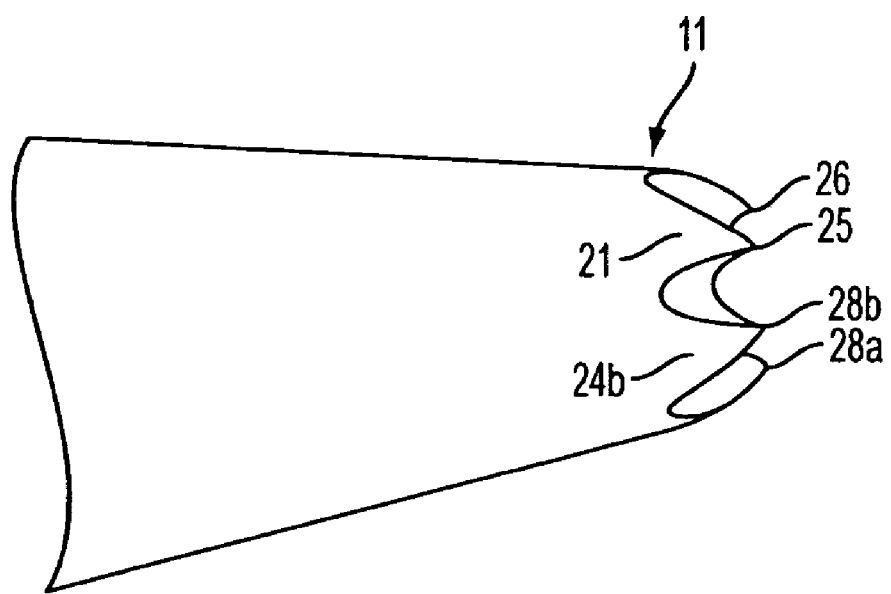
FIG. 6 is a sectional view of a mold showing one embodiment of the invention in which a vent gap is regulated using an active material insert.

The present invention will now be described with respect to several embodiments in which a plastic injection-molding machine for PET performs is supplied with one or more active material elements which serve to regulate vent gaps in injection molds. However, the active material sensors and/or actuators may be placed in any location in the injection molding apparatus in which venting may be desirable. Other applications for such active material elements are discussed in the following related applications: (1) U.S. patent application Ser. No. 10/830,434, filed concurrently on Apr. 23, 2004, entitled "Method and Apparatus for Countering Mold Deflection and Misalignment Using Active Material Elements", (2) U.S. patent application Ser. No. 10/830,403, filed concurrently on Apr. 23, 2004, entitled "Method and Apparatus for Adjustable Hot Runner Assembly Seals and Tip Height Using Active Material Elements", (3) U.S. patent application Ser. No. 10/830,435, filed concurrently on Apr. 23, 2004, entitled "Method and Apparatus for Assisting Ejection from an Injection Molding Machine using Active Material Elements", (4) U.S. patent application Ser. No. 10/830,485, filed concurrently on Apr. 23, 2004, entitled "Method and Apparatus for Mold Component Locking Using Active Material Elements", (5) U.S. patent application Ser. No. 10/830,488, filed concurrently on Apr. 23, 2004, entitled "Methods and Apparatus for Vibrating Melt in an Injection Molding Machine Using Active Material Elements", (6) U.S. patent application Ser. No. 10/830,436, filed concurrently on Apr. 23, 2004, entitled "Method and Apparatus for Injection Compression Molding Using Active Material Elements", and (7) U.S. patent application Ser. No. 10/830,437, filed concurrently on Apr. 23, 2004, entitled "Control System for Utilizing Active Material Elements in a Molding System".

As discussed above, there is a need in the art for a method and apparatus for adjusting one or more vent gaps in an injection molding machine mold in a proactive manner by providing active material means and methods for adjusting vent gaps. In the following description, piezoceramic inserts are described as the preferred active material. However, other materials from the active material family, such as magnetostrictors and shape memory alloys could also be used in accordance with the present invention. A list of possible alternate active materials and their characteristics is set forth below in Table 1, and any of these active materials could be used in accordance with the present invention:

TABLE 1

Comparison of Active Materials

| Material | Temperature Range (° C.) | Nonlinearity (Hysteresis) | Structural Integrity | Cost/Vol. ($/cm3) | Technical Maturity |
|---|---|---|---|---|---|
| Piezoceramic PZT-5A | −50-250 | 10% | Brittle Ceramic | 200 | Commercial |
| Piezo-single crystal TRS-A | — | <10% | Brittle Ceramic | 32000 | Research |
| Electrostrictor PMN | 0-40 | Quadratic <1% | Brittle Ceramic | 800 | Commercial |
| Magnetostrictor Terfenol-D | −20-100 | 2% | Brittle | 400 | Research |
| Shape Memory Alloy Nitinol | Temp. Controlled | High | OK | 2 | Commercial |
| Magn. Activated SMA NiMnGa | <40 | High | OK | 200 | Preliminary Research |
| Piezopolymer PVDF | −70-135 | >10% | Good | 15* | Commercial |

(information derived from www.mide.com)

2. The Structure of the First Embodiment

Figure 7:
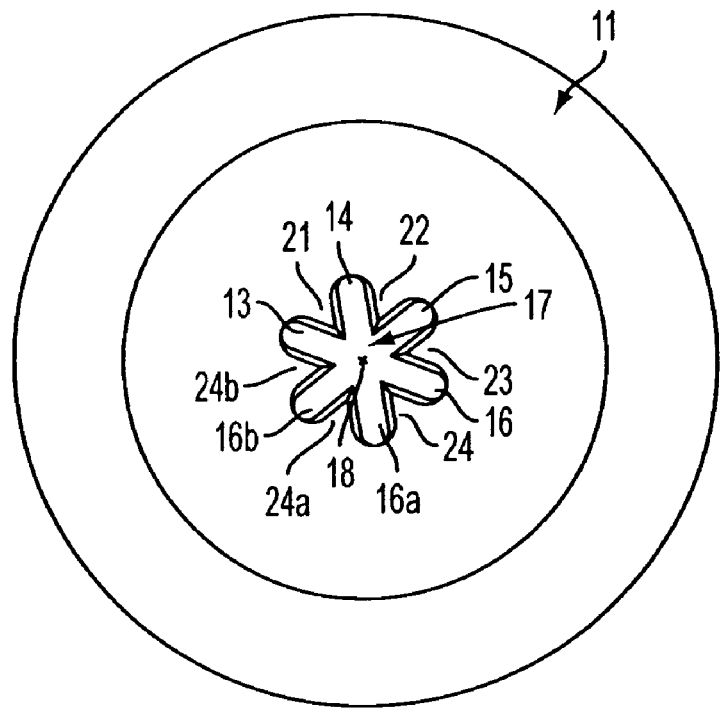
FIG. 7 is a sectional view of a mold in FIG. 6 with the incoming material partially filling the mold cavity.

The first preferred embodiment of the present invention is shown in FIGS. 6 and 7, which depict a piezoceramic insert 450 mounted in a mold cavity block 460 in a vent location. The insert is electrically connected via conduit 451 to a controller 452. A melt sensor 453 is mounted in the cavity block 460 close to the insert 450 and in a position to detect the incoming melt before it reaches the insert 450. The sensor 453 is also connected via conduit 454 to controller 452.

According to an alternate embodiment of the present invention, a mold cavity may include multiple piezoceramic insert controlled vents at several locations. These inserts are all connected to the same controller, and their operation is synchronized and coordinated by the controller to adjust the individual vent gaps to vary the amount of venting available at each location. This in turn will influence to some degree how the melt front progresses in the filling of the mold cavity. Thus, it is possible to control the melt front causing it to accelerate in some areas and decelerate in others by a coordinated actuation of the various vent gaps.

According to the presently preferred embodiment according to the present invention, a piezoceramic insert 450 is connected by wiring 451 to a controller 452, although wireless methods of control are also possible. Optionally, one or more separate piezoceramic sensors (not shown) may be provided to detect changes in the vent gap opening, and when provided are also connected by wiring 451 to the controller 452. The piezo-electric elements used in accordance with the present invention (i.e., the piezo-electric sensors and/or piezo-electric actuators) may comprise any of the devices manufactured by Marco Systemanalyse und Entwicklung GmbH. A piezo-electric sensor may detect the state of the vent gap, and transmit a corresponding sense signal through the wiring connections 451, thereby effecting closed loop feedback control. The piezo-electric actuator receives an actuation signal through the wiring connections 451 and applies a corresponding force to adjust the opening of the vent gap. Note that piezo-electric sensors may also be provided to sense pressure from any desired position. Likewise, more than one piezo-electric actuator may be provided, mounted serially or in tandem, in order to effect extended movement, angular movement, etc.

Piezoceramic actuator 450 is preferably a single actuator. According to a presently preferred embodiment, the actuator increases in size by approximately 0.015% when a voltage of 1000 V is applied via wiring 451. However, use of multiple actuators and/or actuators having other shapes are contemplated as being within the scope of the invention, and the invention is therefore not to be limited to any particular configuration of the piezoceramic insert 450.

Note that piezoceramic sensors may be provided to sense pressure at any desired position. Likewise, more than one piezoceramic insert 450 may be provided, mounted serially or in tandem, in order to effect extended movement, angular movement, etc. Further, each piezoceramic element may be segmented into one or more arcuate, trapezoidal, rectangular, etc., shapes which may be separately controlled to provide varying vent closing forces at various locations between the vent gap. Additionally, piezo-electric actuators and/or actuator segments may be stacked in two or more layers to effect fine sealing force control, as may be desired.

The wiring 451 is coupled to any desirable form of controller or processing circuitry 452 for reading the piezo-electric sensor signals and/or providing the actuating signals to the piezo-electric actuators. For example, one or more general-purpose computers, Application Specific Integrated Circuits (ASICs), Digital Signal Processors (DSPs), gate arrays, analog circuits, dedicated digital and/or analog processors, hard-wired circuits, etc., may control or sense the piezo-electric element 450 described herein. Instructions for controlling the one or more processors may be stored in any desirable computer-readable medium and/or data structure, such floppy diskettes, hard drives, CD-ROMs, RAMs, EEPROMs, magnetic media, optical media, magneto-optical media, etc.

Use of the piezoceramic insert 450 according to the present embodiment allows the various components of the injection mold assembly described above to be manufactured to lower tolerance, thereby decreasing the cost of manufacturing the injection mold components and associated machinery. Previously, tolerances of 5-30 microns were used in order to achieve a functional vent gap. Further benefits include the ability to control the size of the vent gap more efficiently, thereby preventing leakage of melt from the vent gap, or clogging of the vent gap, thereby reducing the length of any equipment down time.

3. The Process of the First Embodiment

In operation, the piezoceramic insert 450 is sized and positioned in the mold cavity block 460 to provide an optimum vent gap, which can be larger than the nominal 0.025 mm-0.075 mm (0.001"-0.003") range, a size that would allow the melt to enter the vent gap. At this optimum vent gap the air being exhausted from the mold cavity experiences no resistance to flow as it passes through the vent gap and vent collector 455. FIG. 7 shows the injected plastic melt 491 advancing towards the vent area. As the melt approaches and eventually touches the sensor 453, which may detect a rapid rise in temperature or pressure, sensor 453 transmits a signal via conduit 451 to controller 452.

When the piezo-electric sensor is used with the actuator in a closed loop control configuration, the sensor element generates a signal in response to contact with the injected plastic melt 491 (which may be based on changes in temperature, pressure, etc.), and transmits the signal via conduit 451 to the controller 452. Based on the signals received from the sensor, the controller then generates appropriate actuation signals that are transmitted via conduit 451 to the actuator element, energizing it in accordance with the data received from the sensor to accomplish proper vent gap control. For example, the controller 452 may be programmed to cause the sealing force at the vent gap or to increase and/or decrease according to the detected temperature, pressure, etc.

Controller 452 may include a computer or PLC or similar device for receiving the sensor's signal, evaluating its magnitude and consequently sending a command signal to the piezoceramic insert 450 via conduit 451. The command signal may energize the insert sufficiently to partially reduce the vent gap or to completely close the vent gap depending upon the resin being injected into the mold and/or a variety of other parameters that may have been input to the controller. For example, the injection rate, melt temperature, mold temperature and injection pressure are parameters that may be sensed and input to the controller since they all have an effect on the way the melt will fill the mold cavity and consequently affect the timing and gap setting parameters of the vent. Some or all of these parameters may be included in the controller's computation of the command signal it eventually dispatches to the insert 450. The command signal to the insert 450 will activate the insert to either prevent plastic from entering the vent and collector, or it may be activated earlier in the filling process based other sensed parameters, such as those listed above, so that an alteration in the vent gap will alter the speed at which air is exhausted from the mold, which in turn may cause the melt front to alter direction or speed thereby effecting a control on how the melt fills the cavity.

4. The Structure of the Second Embodiment

Figure 8:
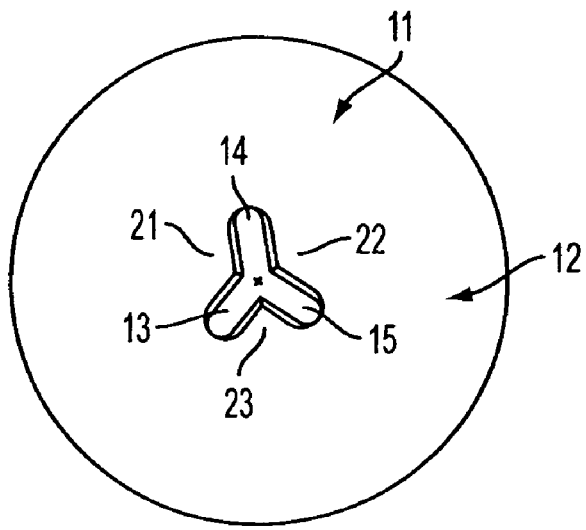
FIG. 8 is a sectional view of a mold showing a second alternate embodiment of the invention in which a vent is regulated using an active material insert.

A second preferred embodiment according to the present invention is shown in FIG. 8, which shows a mold cavity 474 with two gates 470 and 471 such that melt enters the cavity from two places. The respective melt fronts 472 and 473 eventually meet at some point near the middle of the mold cavity 474. Clearly air in the mold cavity is pushed by both melt fronts and can become trapped in the middle of the cavity absent a vent. To exhaust the air a vent 475 is provided at the location where the melt fronts 472 and 473 are expected to meet. A piezoceramic insert 476 is positioned at the vent 475 to control the vent gap. The insert is connected via conduit 477 to a controller 483 for controlling the vent gap as previously described. Vent collector channel 478 provides an enlarged passageway for the air to exit the vent. Arrow B indicates the air exhausting from the mold cavity as the melt fronts approach each other.

Sensors 479 and 480 are positioned either side of the vent 475 and are connected via conduits 481 and 482 to the controller 483 to signal the approach of each of the melt fronts respectively. The piezo-electric elements used in accordance with the present invention (i.e., the piezo-electric sensors and/or piezo-electric actuators) may comprise any of the devices manufactured by Marco Systemanalyse und Entwicklung GmbH. The piezo-electric sensors can detect the pressure at various interfaces within the nozzle assembly and transmit a corresponding sense signal through the conduits 481 and 482, thereby effecting closed loop feedback control. The piezo-electric actuators then receive actuation signals through the conduits 481 and 482, and apply corresponding forces. Note that piezo-electric sensors may be provided to sense pressure or temperature from any desired position. Likewise, more than one piezo-electric actuator may be provided in place of any single actuator described herein, and the actuators may be mounted serially or in tandem, in order to effect extended movement, angular movement, etc.

As mentioned above, one of the significant advantages of using the above-described active element inserts is to allow the manufacturing tolerances used for the vent gap to be widened, thereby significantly reducing the cost of machining those features in the mold.

5. The process of the Second Embodiment

Similar to the process of the first embodiment, in operation, the controller receives sensor signals indicating the proximity of the melt fronts to the vent 475, and based on these signals, sends commands to the piezoceramic actuator 476 to alter the size of the vent gap, thereby ensuring that melt does not enter the vent gap. According to the present embodiment, the energizing piezoceramic element 476 preferably will generate an increase in length of about 0.15% when approximately 1000 V is applied thereto.

The piezoceramic actuator 476 is sized and positioned in the mold cavity block 460 to provide an optimum vent gap. When the vent gap is properly sized, the air being exhausted from the mold cavity (arrow B) experiences no resistance to flow as it passes through the vent 475. FIG. 8 shows the injected plastic melt fronts 472, 473 advancing towards the vent area. As the melt approaches and eventually touches sensors 479, 480, the sensors detect a rapid rise in temperature or pressure, and transmit signals via conduits 481, 482 to controller 483.

Controller 483 may include a computer or Programmable Logic Controller (PLC) or similar device for receiving the sensor's signal, evaluating its magnitude and consequently sending a command signal to the piezoceramic actuator 476 via a conduit. The command signal may energize the insert sufficiently to partially reduce the vent gap or to completely close the vent gap depending upon the resin being injected into the mold and/or a variety of other parameters that may have been input to the controller.

6. Conclusion

Thus, what has been described is a method and apparatus for using active material elements in an injecting molding machine, separately and in combination, to effect useful improvements in injection molding apparatus, including provision of adjustable venting in an injection mold.

Advantageous features according the present invention include: 1. A piezo ceramic element used singly or in combination to control a vent gap anywhere in an injection mold; 2. The use of one or more vent gaps to direct the movement of a melt front of injected plastic in a mold cavity; 3. An injection mold including a vent gap regulated by active material elements; 4. Dynamic adjustment of vent gaps using local force generating unit.

While the present invention provides distinct advantages for injection-molded PET plastic preforms generally having circular cross-sectional shapes perpendicular to the preform axis, those skilled in the art will realize the invention is equally applicable to other molded products, possibly with non-circular cross-sectional shapes, such as, pails, paint cans, tote boxes, and other similar products. All such molded products come within the scope of the appended claims.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above (and particularly the applications discussed above in paragraph [0029]) are hereby incorporated by reference into the Detailed Description of the Preferred Embodiments.

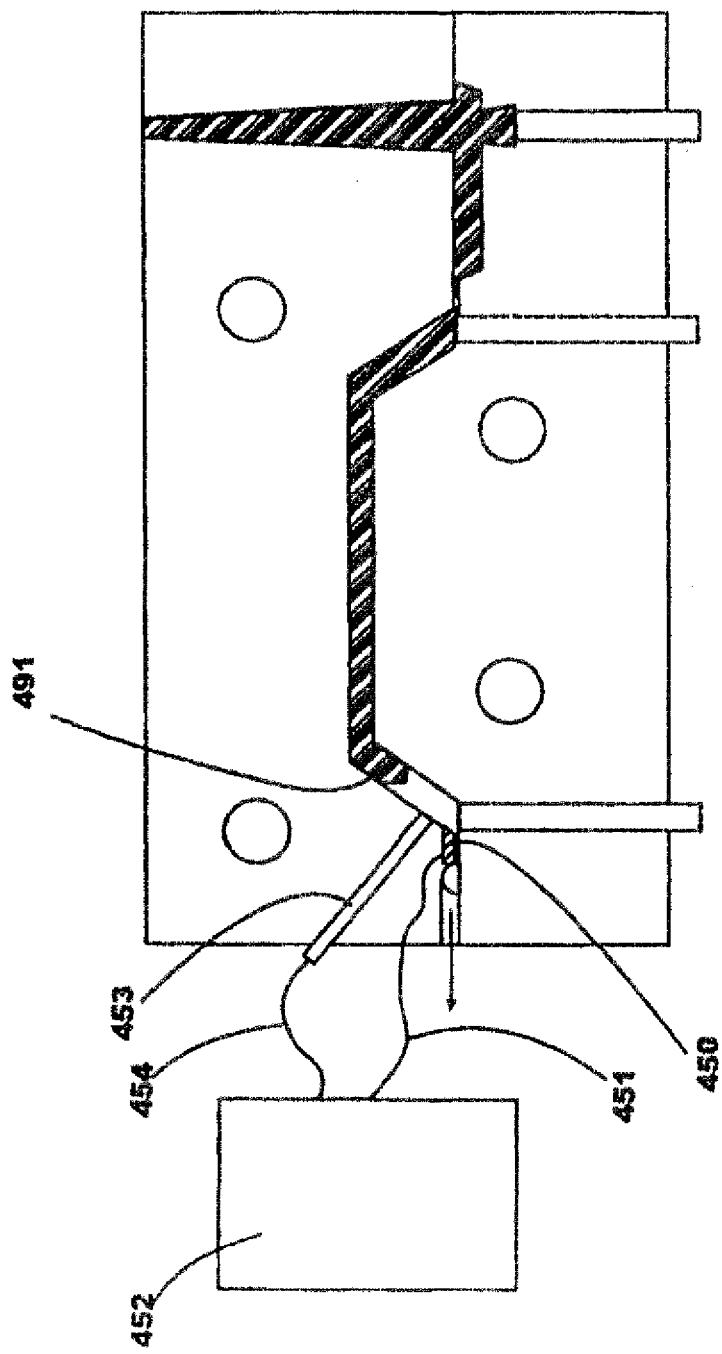

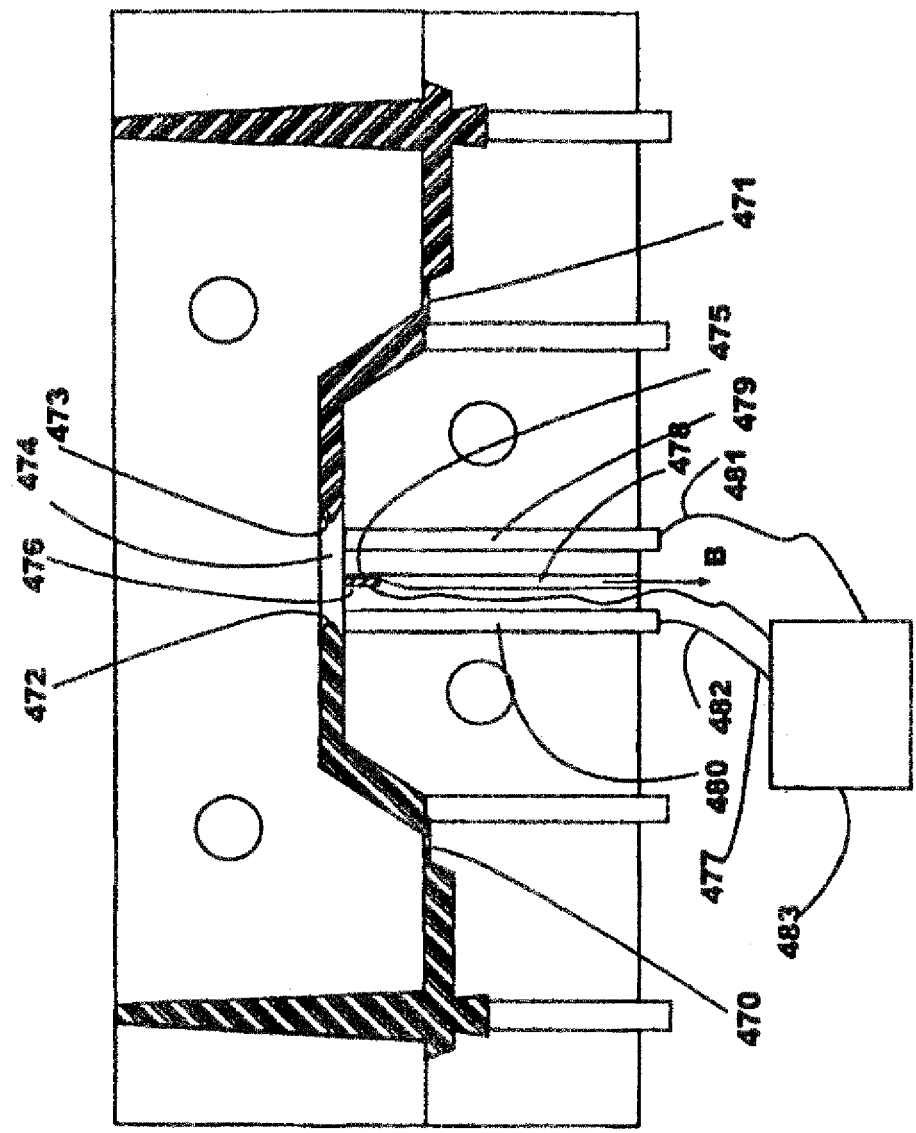

What is claimed is:

1. Apparatus for controlling an injection mold vent gap, comprising:
    an active material disposed adjacent the vent gap and configured to change dimension upon application of an electrical signal, in order to at least partially close the vent gap; wherein an active material is selected from the group consisting of piezoactuators, piezoceramics, electrostrictors, and magnetostrictors and
    Further a transmission structure configured to supply the electrical signal to said active material element, to cause said active material to change dimension to at least partially close the vent gap wherein said active material element disposed between a vent gap and a vent collector.

2. Apparatus according to claim 1, further comprising an active material sensor disposed to detect molding material approaching the vent gap, and to generate a sense signal corresponding thereto.

3. Apparatus according to claim 2, further comprising control structure configured, to (i) receive the sense signal, (ii) in response to the sense signal, generate the actuation signal, and (iii) transmit the actuation signal to said active material element.

4. Apparatus according to claim 3, further comprising a plurality of active material elements and a plurality of active material sensors, and wherein said control structure receives sense signals from said plurality of active material sensors, and transmits actuation signals to the plurality of active material elements.

5. Apparatus according to claim 4, wherein each of said active material elements and each of said active material sensors comprises a piezoceramic material.

6. An injection mold vent gap control device comprising:
    a piezo-electric actuator disposed to at least partially block a mold vent that is in communication with a mold cavity, said piezo-electric actuator, upon receiving an electical signal, changing dimension to at least partially close the mold vent gap.

7. The injection mold vent gap control device of claim 6, wherein in molds comprising multiple vents, at least one piezo-electric actuator is positioned in each vent.

8. The injection mold vent gap control device of claim 6, further comprising:
    a controller connected to said piezoelectric actuator by electrical wiring; and
    a sensor connected to said controller by electrical wiring, where the sensor sends data to the controller regarding the condition of the melt within the mold cavity.

9. The molding machine vent gap control device of claim 8, wherein said sensor comprises an active material element.

10. The molding machine vent gap control device of claim 8, wherein a combination of the actuator, the sensor, and the controller performs closed-loop control over the vent gap based on melt conditions.

11. An injection mold, comprising:
    a first mold half;
    a second mold half;
    a vent for venting gas from at least one of the first mold half and the second mold half; and
    a piezo-electric element configured to change dimension upon application and removal of an actuation signal thereto, said dimension change at least partially closing or opening said vent to control the venting of gas therethrough.

12. An injection mold hot half system, comprising;
    a heated mold half having at least one vent portion therein; and
    an active material element coupled to said heated mold half and configured to at least partially close the vent portion in response to a change in dimension caused by application or removal of an actuation signal wherein an active material is selected from the group consisting of piezoactuators, piezoceramics, electrostrictors, and magnetostrictors.

13. A vented injection mold, comprising:
    a mold cavity half;
    a mold core half;
    a vent in communication with a mold cavity formed between said cavity half and said core half; and
    a piezo-electric actuator positioned within said vent, said piezo-electric actuator, upon application or release of an electrical signal, changing dimension to at least partially block the vent.

14. The vented injection mold of claim 13, further comprising:
    a sensor in communication with said mold cavity, and
    control means in communication with each of said piezo-electric actuator and said sensor.

15. The vented injection mold of claim 14, wherein said control means, in response to a sense signal from said sensor, transmits an actuation signal to said piezo-electric actuator, to cause said actuator to change dimension to control a flow of injected material through said vent.

* * * * *

UNITED STATES PATENT AND TRADEMARK OFFICE
CERTIFICATE OF CORRECTION

| | | |
|---|---|---|
| PATENT NO. | : 7,481,642 B2 | |
| APPLICATION NO. | :10/830438 | |
| DATED | : January 27, 2009 | |
| INVENTOR(S) | : Niewels | |

It is certified that error appears in the above-identified patent and that said Letters Patent is hereby corrected as shown below:

THE TITLE PAGE, SHOWING AN ILLUSTRATIVE FIGURE SHOULD BE DELETED AND SUBSTITUTE THEREFOR THE ATTACHED TITLE PAGE.

DELETE DRAWING SHEETS 1-7 AND SUBSTITUTE THEREFOR THE DRAWING SHEETS CONSISTING OF FIGS 1-8 AS SHOWN ON THE ATTACHED PAGES.

Signed and Sealed this

Thirtieth Day of June, 2009

JOHN DOLL
*Acting Director of the United States Patent and Trademark Office*

United States Patent
Niewels

(10) Patent No.: US 7,481,642 B2
(45) Date of Patent: Jan. 27, 2009

(54) METHOD AND APPARATUS FOR CONTROLLING A VENT GAP WITH ACTIVE MATERIAL ELEMENTS

(75) Inventor: Joachim Johannes Niewels, Thornton (CA)

(73) Assignee: Husky Injection Molding Systems Ltd. (CA)

(*) Notice: Subject to any disclaimer, the term of this patent is extended or adjusted under 35 U.S.C. 154(b) by 952 days.

(21) Appl. No.: 10/830,438

(22) Filed: Apr. 23, 2004

(65) Prior Publication Data
US 2005/0236726 A1 Oct. 27, 2005

(51) Int. Cl.
B29C 45/00 (2006.01)
B29C 45/76 (2006.01)

(52) U.S. Cl. .................. 425/135; 425/146; 425/149; 425/812; 425/DIG. 226

(58) Field of Classification Search ............ 425/135, 425/149, 812, 146, DIG. 226
See application file for complete search history.

(56) References Cited

U.S. PATENT DOCUMENTS

| | | | |
|---|---|---|---|
| 4,420,454 A | 12/1983 | Kawaguchi et al. | |
| 4,431,047 A | 2/1984 | Takeshima et al. | |
| 4,469,649 A | 9/1984 | Ibar | |
| 4,489,771 A | 12/1984 | Takeshima et al. | |
| 4,556,377 A | 12/1985 | Brown | |
| 4,588,367 A | 5/1986 | Schad | |
| 4,660,801 A | 4/1987 | Schad | |
| 4,803,393 A * | 2/1989 | Takahashi | 310/328 |
| 4,828,769 A | 5/1989 | Maus et al. | |
| 4,852,634 A * | 8/1989 | Kawai et al. | 164/457 |
| 4,995,455 A | 2/1991 | Shigyo | |
| 5,004,038 A * | 4/1991 | Kuriyama | 164/305 |

(Continued)

FOREIGN PATENT DOCUMENTS

EP 0 448 855 A1 10/1991

(Continued)

OTHER PUBLICATIONS marco: Structure and characteristics of piezokeramisher pile actuators [online], marco Systemanalyse und Entwicklung GmbH, Sep. 16, 2003 Translated Version (from German to English by Yahoo translation tool) (retrieved on Oct. 13, 2004)<URL: http://www.marco.de/E/D/pa/017.html>.

(Continued)

Primary Examiner—Steven P. Griffin
Assistant Examiner—Seyed Masoud Malekzadeh
(74) Attorney, Agent, or Firm—Katten Muchin Rosenman LLP

(57) ABSTRACT

Method and apparatus for controlling a vent gap in a mold for an injection molding machine are provided, and include an active material insert configured to be regulate the degree of opening of the vent gap. The active material insert is configured to be actuated in response to signals from a controller, so as to selectively block the opening of the vent gap during the molding process. Wiring structure is coupled to the active material insert, and is configured to carry the actuation signals. Melt flow sensors may also be provided to aid in regulating the vent gap, and may be connected to the controller in order to provide real-time closed loop control over the operation of the vent gap. Preferably, the methods and apparatus are used as part of a system for controlling the flow of melt within a mold cavity.

15 Claims, 8 Drawing Sheets

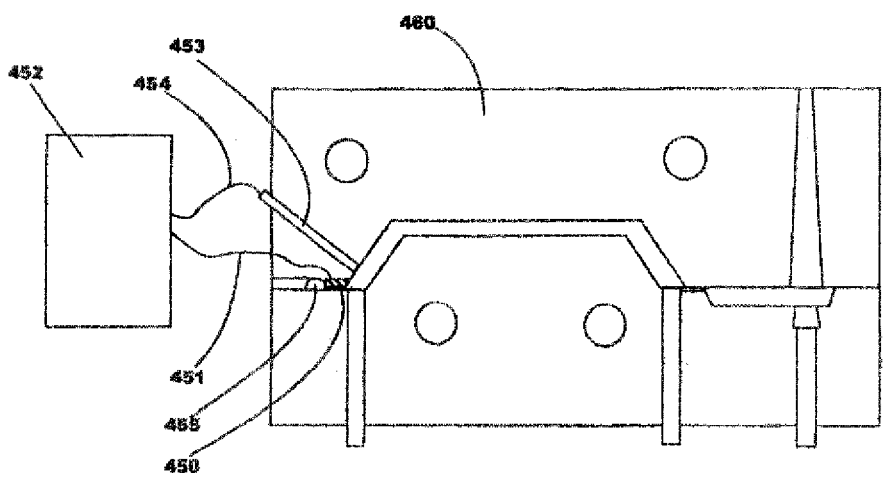

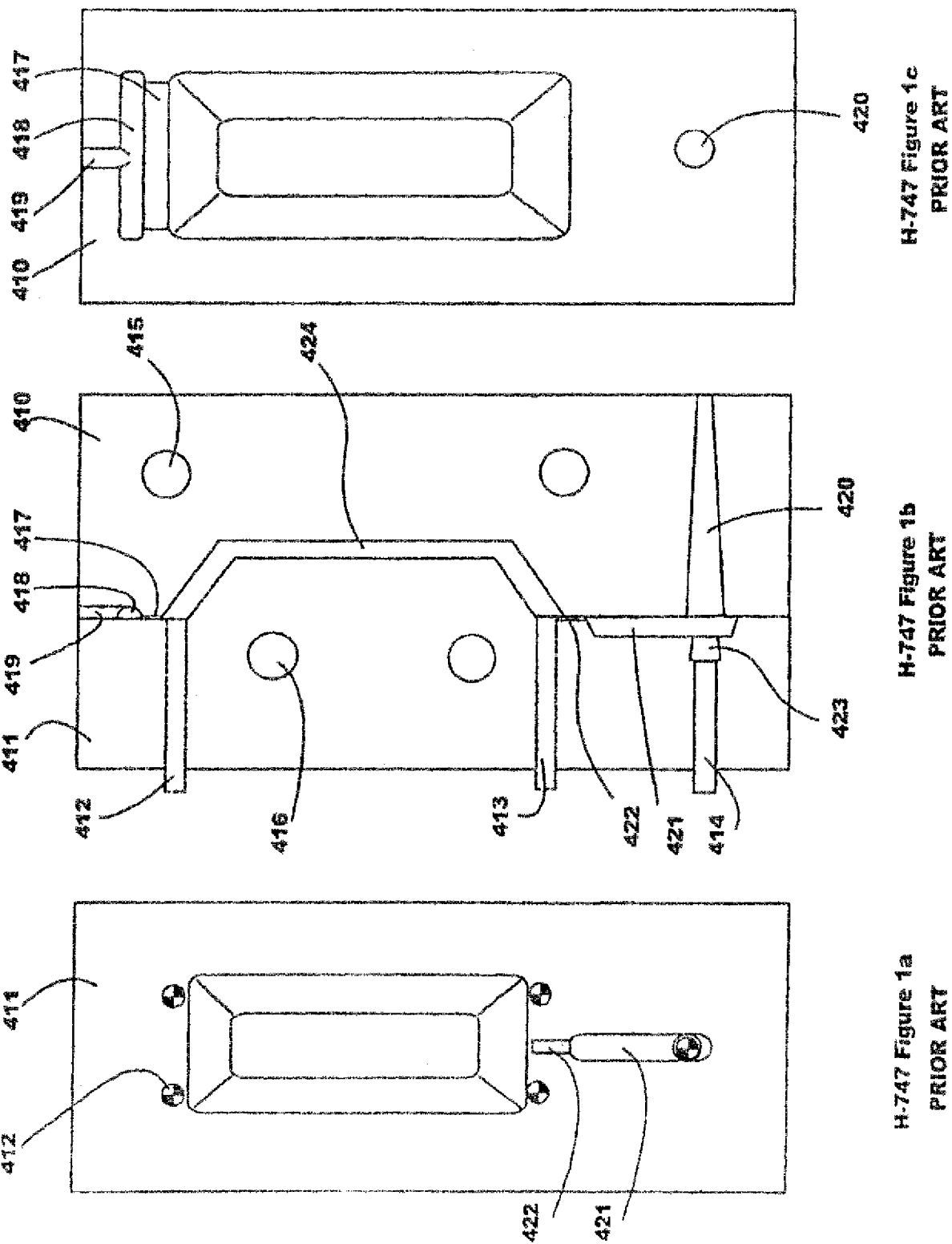

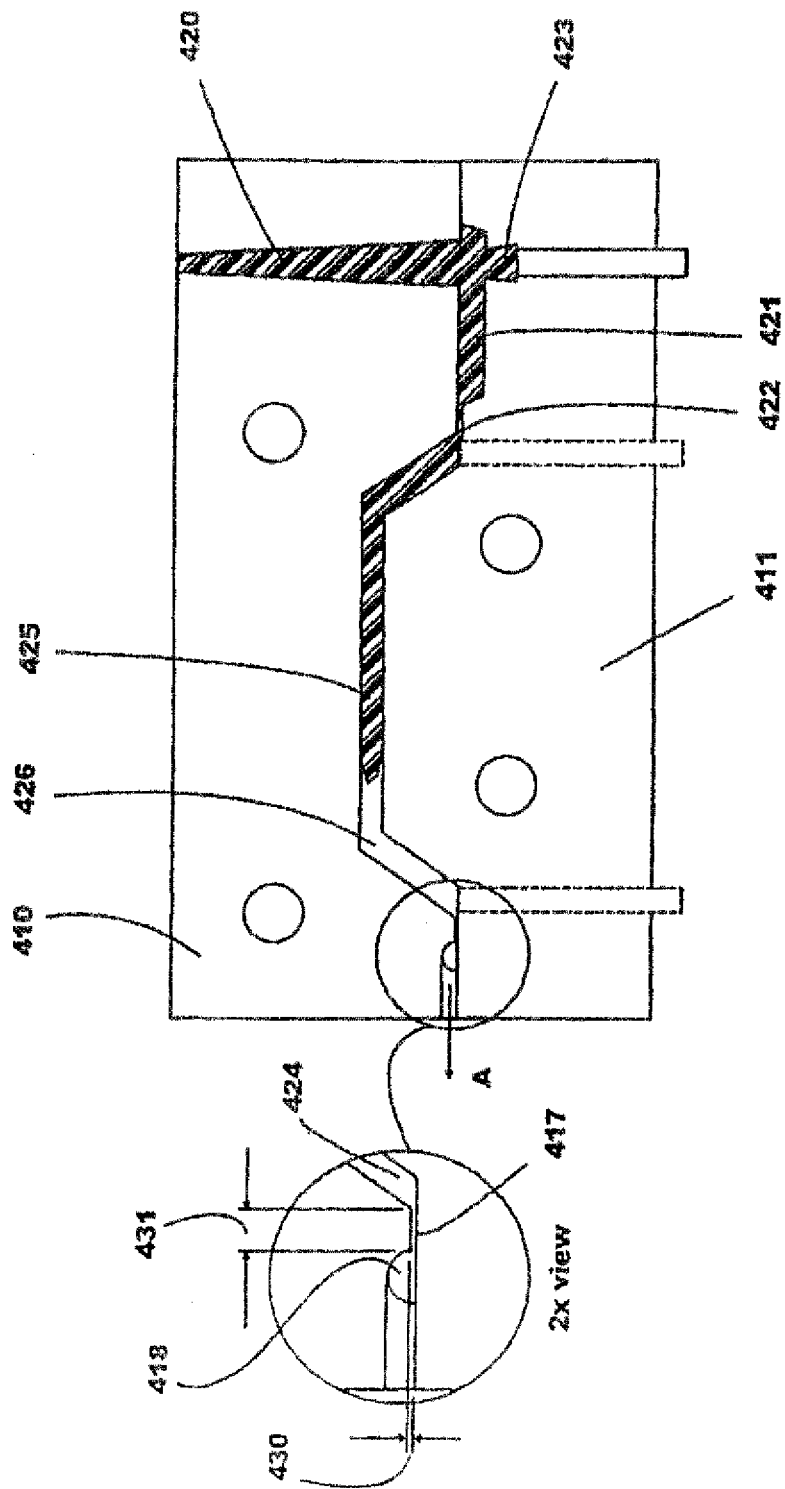
H-747 Figure 2
PRIOR ART

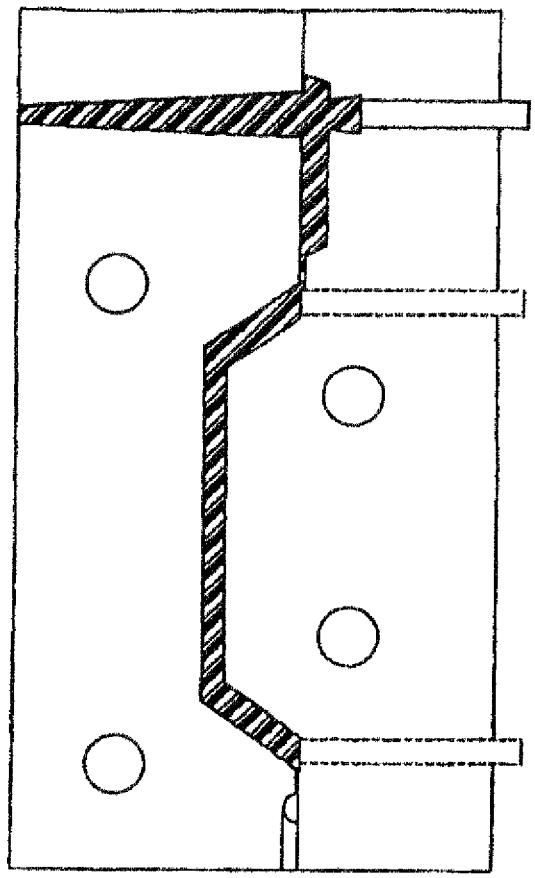
H-747 Figure 3
PRIOR ART

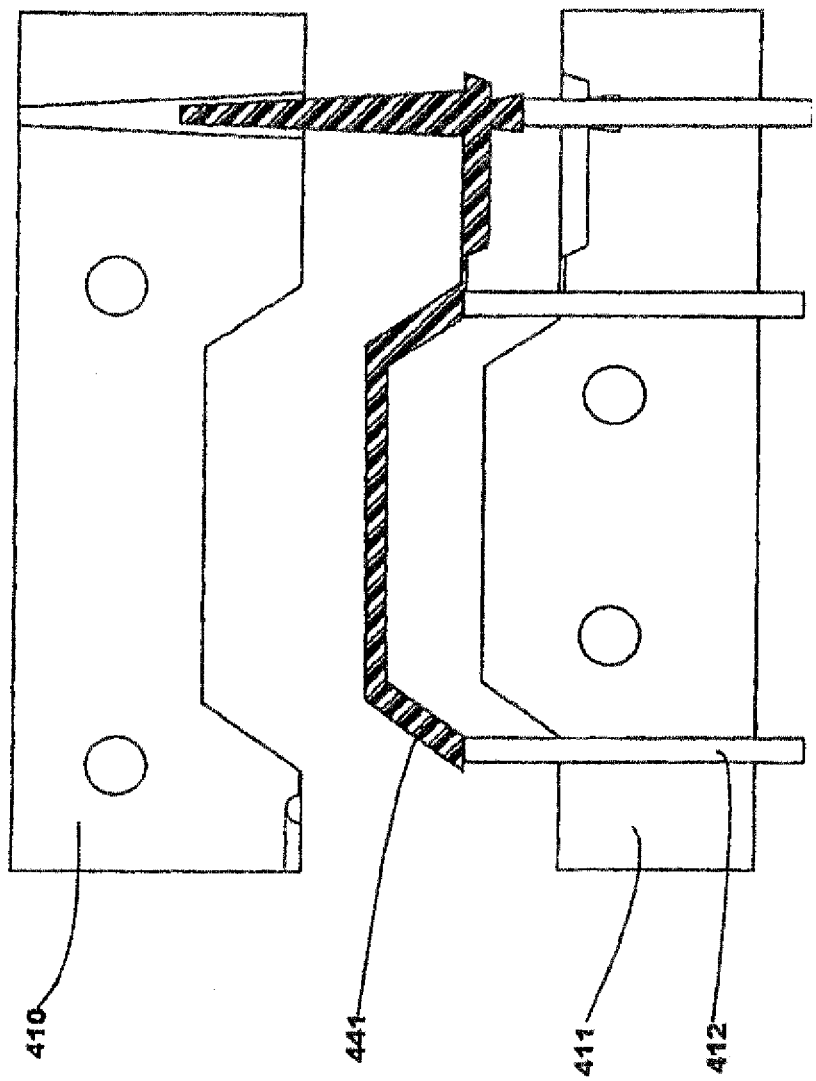
H-747 Figure 4
PRIOR ART

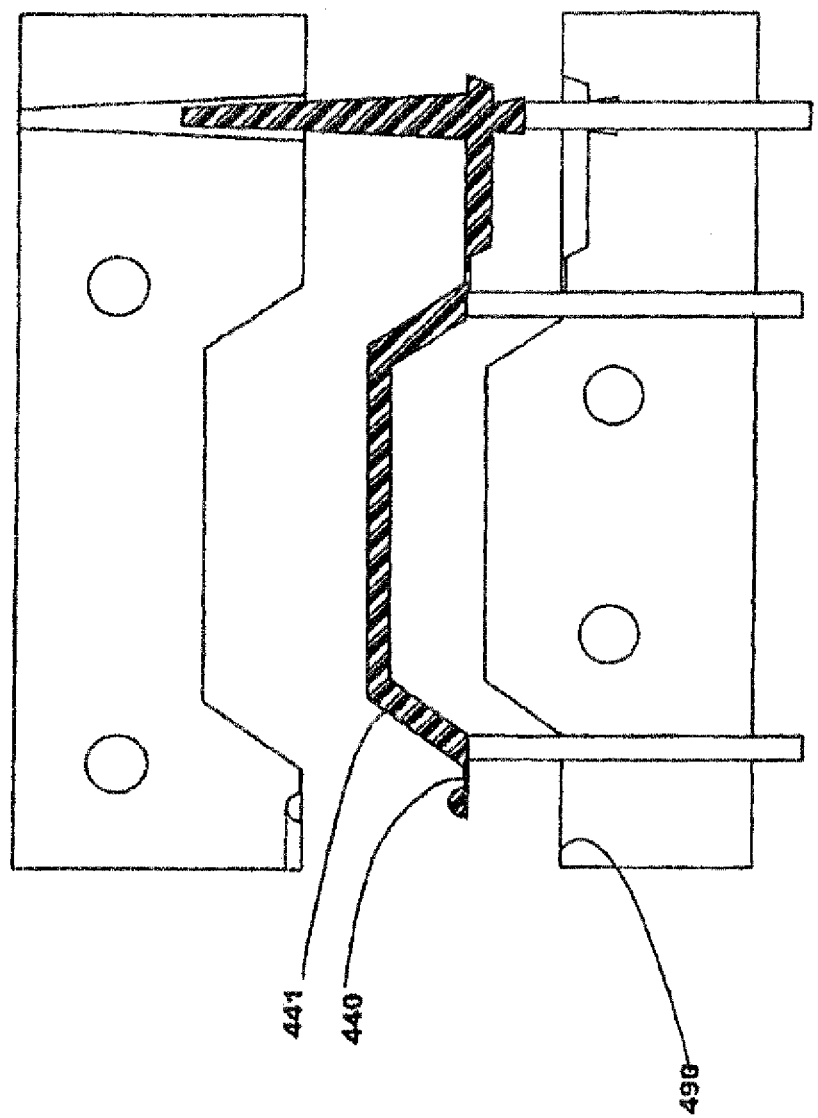
H-747 Figure 5
PRIOR ART

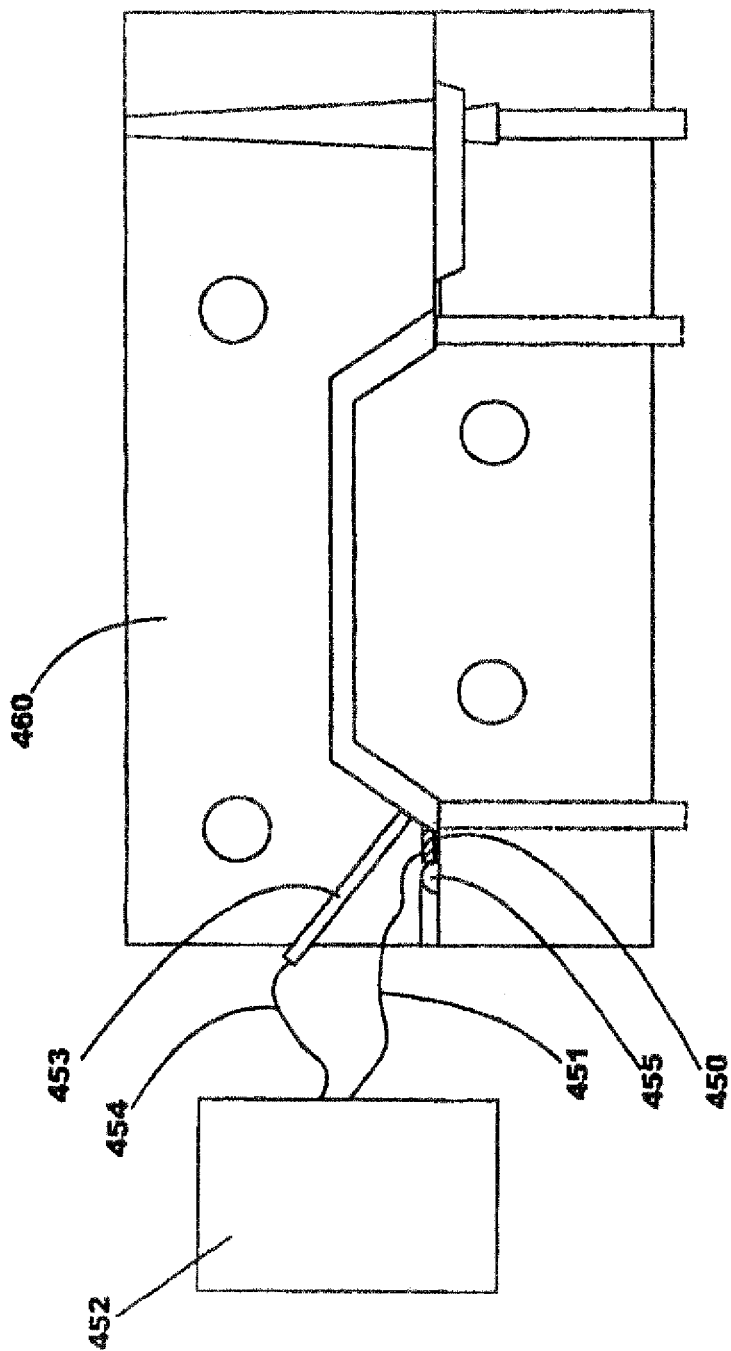
H-747 Figure 6